US009731655B2

(12) United States Patent
Nakasone

(10) Patent No.: US 9,731,655 B2
(45) Date of Patent: Aug. 15, 2017

(54) OPENING/CLOSING DEVICE

(71) Applicant: PIOLAX, INC., Yokohama (JP)

(72) Inventor: Hisashi Nakasone, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/783,073

(22) PCT Filed: Apr. 1, 2014

(86) PCT No.: PCT/JP2014/059630
§ 371 (c)(1),
(2) Date: Oct. 7, 2015

(87) PCT Pub. No.: WO2014/168042
PCT Pub. Date: Oct. 16, 2014

(65) Prior Publication Data
US 2016/0068109 A1 Mar. 10, 2016

(30) Foreign Application Priority Data
Apr. 9, 2013 (JP) .................................. 2013-081413

(51) Int. Cl.
| B60R 7/06 | (2006.01) |
| B60N 2/46 | (2006.01) |
| E05D 11/08 | (2006.01) |
| B65D 43/16 | (2006.01) |
| B65D 43/26 | (2006.01) |
| E05D 5/10 | (2006.01) |

(52) U.S. Cl.
CPC ................ B60R 7/06 (2013.01); B60N 2/466 (2013.01); B60N 2/4606 (2013.01);
(Continued)

(58) Field of Classification Search
CPC ............. B60R 11/00; B60R 2011/0007; B60R 2011/0075; B60R 2011/0094;
(Continued)

(56) References Cited

U.S. PATENT DOCUMENTS

| 8,752,248 B2 * | 6/2014 | Nakasone | ............... B60R 11/00 16/337 |
| 2008/0120809 A1 * | 5/2008 | Nakasone | ................. B60R 7/04 16/338 |

(Continued)

FOREIGN PATENT DOCUMENTS

CN 101920681 A 12/2010
JP UM-S 38-015923 B 9/1969
(Continued)

OTHER PUBLICATIONS

International Search Report (ISR) (PCT Form PCT/ISA/210), in PCT/JP2014/059630, dated Jul. 1, 2014.
(Continued)

*Primary Examiner* — Glenn Dayoan
*Assistant Examiner* — Sunsurraye Westbrook
(74) *Attorney, Agent, or Firm* — McGinn IP Law Group, PLLC

(57) ABSTRACT

An opening/closing device includes a fixed member, an opening/closing member, and a hinge device. The fixed member has inside wall sections and pin insertion holes. The opening/closing member has outside wall sections and pin supporting holes. The hinge device has a case that is inserted and held between the inside wall sections, pressing members that are disposed inside the case and are capable of rotating, a spring disposed between the pressing members, and pin members that are inserted through the pin supporting holes and the pin insertion holes and engage with the pressing members. The pin members are inserted through the pin supporting holes and the pin insertion holes from the outside of the outside wall sections.

19 Claims, 18 Drawing Sheets

(52) U.S. Cl.
CPC ......... *B60N 2/4686* (2013.01); *B65D 43/165* (2013.01); *B65D 43/26* (2013.01); *E05D 11/081* (2013.01); *E05D 2005/106* (2013.01); *E05Y 2900/538* (2013.01)

(58) Field of Classification Search
CPC ..... E05D 11/081; E05D 7/1011; B60N 3/101; B60N 2/4686; B60N 3/002; B60N 3/10; B60N 3/102; B60N 3/12; B60N 2/46; B60N 2/4606
USPC ...... 16/277, 337, 341, 342; 296/37.12, 37.1, 296/37.8, 70, 37.9; 180/9
See application file for complete search history.

(56) References Cited

U.S. PATENT DOCUMENTS

| | | | |
|---|---|---|---|
| 2010/0077565 A1* | 4/2010 | Huang | .................. E05D 5/121 16/342 |
| 2010/0313384 A1 | 12/2010 | Nakasone | |
| 2013/0134729 A1* | 5/2013 | Zimmerman | ............. B60R 7/04 296/24.34 |

FOREIGN PATENT DOCUMENTS

| | | |
|---|---|---|
| JP | UM-H 3-017677 A | 2/1991 |
| JP | H 05-248134 A | 9/1993 |
| JP | 09-267852 A | 10/1997 |
| JP | H 10-282545 A | 10/1998 |
| JP | 2001-322502 A | 11/2001 |
| JP | 2003-269438 A | 9/2003 |
| JP | 2005-054807 A | 3/2005 |
| JP | 2010-286039 A | 12/2010 |
| WO | WO 03/004887 A | 1/2003 |

OTHER PUBLICATIONS

Japanese Office Action dated Jun. 28, 2016, with an English translation thereof.
Japanese Office Action dated Feb. 7, 2017, with an English translation thereof.

* cited by examiner

OPENING/CLOSING DEVICE

TECHNICAL FIELD

The present invention relates to an opening/closing device that includes a fixed member, an opening/closing member to open and close to the fixed member, and a hinge device to mount the opening/closing member in an openable and closable manner on the fixed member.

BACKGROUND ART

For example, center consoles, armrests, glove compartments, and the like are installed in automobiles, and lids, covers, and the like are mounted thereon in an openable and closable manner via hinge devices.

Patent Document 1 describes a hinge device that includes a first member including a pair of pin insertion holes, a second member including a pair of pin supporting holes that are disposed outside of the pin insertion holes of the first member concentrically with the pin insertion holes, a pair of pin members arranged to be inserted into the pin insertion holes and the pin supporting holes, to support the first member rotationally movably in the pin insertion holes, and to support to lock the second member in the pin supporting holes, a compression spring disposed between the pair of pin members and arranged to press to bring the pair of pin members into contact with the first member, and a pressure contact surface disposed between the pin members and the first member.

The above-described hinge device is assembled such that the second member is disposed so that the pair of pin supporting holes match the outside of the pair of pin insertion holes of the first member, the pair of pin members are then housed into the first member from the peripheral wall opening of the first member, the pin members are individually inserted into the pin insertion holes and the pin supporting holes, and then the compression spring is disposed between the pair of pin members, and thereby the pair of pin members are pushed outward to make the first member and the second member rotationally movable.

Then, the first member is screwed to be fixed to a fixed member such as an armrest main body, and the second member is screwed to be fixed to an opening/closing member such as a lid, and thereby the opening/closing member is mounted on the fixed member via the hinge device in an openable and closable manner.

CITATION LIST

Patent Literature

Patent Document 1: JP-2010-286039-A

SUMMARY OF THE INVENTION

Problem that the Invention is to Solve

However, in the case of the hinge device of Patent Document 1, the first member and the second member need to be fixed individually to the fixed member such as an armrest main body and the opening/closing member such as a lid with screws or the like, so that there arise problems in that the operation is complicated and assembly workability is not favorable.

Thus, an object of the present invention is to provide an opening/closing device in which an opening/closing member can be mounted easily on a fixed member to improve assembly workability.

Means for Solving the Problem

To achieve the above-described object, an aspect of the present invention provides
an opening/closing device including:
a fixed member;
an opening/closing member arranged to open and close the fixed member; and
a hinge device arranged to mount the opening/closing member in an openable and closable manner on the fixed member,
wherein one of the fixed member and the opening/closing member includes a pair of facing inner wall portions, and a pair of concentric pin insertion holes disposed in the inner wall portions,
wherein the other one of the fixed member and the opening/closing member includes a pair of facing outer wall portions disposed on outer sides of the inner wall portions, and a pair of pin supporting holes disposed in the outer wall portions and arranged to match the pin insertion holes, and
wherein the hinge device includes:
a case provided with axis holes on its both end surfaces, the axis holes being arranged to match the pin insertion holes and the pin supporting holes, and inserted between the pair of facing inner wall portions to be engaged and held with respect to the inner wall portions;
a pair of pressure contact members disposed inside the case, individually inserted into the axis holes, and rotationally movable with respect to the case;
a spring disposed between the pair of pressure contact members so as to press the pressure contact members to be brought into contact with inner surfaces of the case; and
a pin member arranged to be inserted into the pin supporting holes and the pin insertion holes from outside of the outer wall portions so as to engage the pressure contact members.

Another aspect of the present invention provides
an opening/closing device including:
a fixed member;
an opening/closing member arranged to open and close the fixed member; and
a hinge device arranged to mount the opening/closing member in an openable and closable manner on the fixed member,
wherein one of the fixed member and the opening/closing member includes a pair of facing inner wall portions, and a pair of concentric pin insertion holes disposed in the inner wall portions,
wherein the other one of the fixed member and the opening/closing member includes a pair of facing outer wall portions disposed on outer sides of the inner wall portions, and a pair of pin supporting holes disposed in the outer wall portions and arranged to match the pin insertion holes, and
wherein the hinge device includes:
a case provided with axis holes on its both end surfaces, the axis holes being arranged to match the pin insertion holes and the pin supporting holes, and inserted between the pair of facing inner wall portions to be engaged and held with respect to the inner wall portions;

a pair of pin-formed pressure contact members disposed inside the case so as to be inserted into the pin insertion holes and the pin supporting holes through the axis holes; and a spring disposed between the pair of pin-formed pressure contact members so as to press the pin-formed pressure contact members to be into contact with inner surfaces of the case, such that pins of the pin-formed pressure contact members are allowed to be pushed into the case while compressing the spring.

There may be provided, based on the above structure, the opening/closing device, wherein the pin members or the pin-formed pressure contact members are locked with respect to the pin supporting holes of the outer wall portions, and are rotatable with respect to the pin insertion holes of the inner wall portions.

There may be provided, based on the above structure, the opening/closing device, a retaining structure arranged to hold the pin member with respect to the outer wall portions, the retaining structure disposed between the pin member and the outer wall portions.

There may be provided, based on the above structure, the opening/closing device, further including:

holding members that are mounted on both inner ends of the case, that include insertion holes communicating with the axis holes, and that include members separate from the case, wherein the pressure contact members or the pin-formed pressure contact members are pressed to be brought into contact with inner peripheries of the insertion holes of the holding members.

There may be provided, based on the above structure, the opening/closing device, wherein the opening/closing device is for use in a center console and/or an armrest that is disposed between a driver seat and a front passenger seat of an automobile, and wherein the fixed body has a box shape, and the opening/closing member is a lid mounted on the fixed member in an openable and closable manner.

Advantageous Effects of Invention

With the aspect of the opening/closing device according to the present invention, it is possible to mount the opening/closing member in an openable and closable manner on the fixed member only by setting in advance the pressure contact members and the spring in the case, inserting the case between the inner wall portions to make the case engage the inner wall portions, inserting the pin member into the pin supporting holes and the pin insertion holes from the outer sides of the outer wall portions in this state, and making the pin member engage the pressure contact members. Thus, assembly workability can be improved.

With the another aspect of the opening/closing device according to the present invention, it is possible to mount the opening/closing member in an openable and closable manner on the fixed member only by setting in advance the pin-formed pressure contact members and the spring in the case, compressing the spring to push the pins of pin-formed pressure contact members into the case, and inserting the case between the inner wall portions in this state to make the case engage the inner wall portions, which allows the pins of pin-formed pressure contact members to be inserted into the pin insertion holes of the inner wall portions and the pin supporting holes of the outer wall portions by the biasing force of the spring. Thus, assembly workability can be improved.

MODE FOR CARRYING OUT THE INVENTION

Hereinafter, a description of the opening/closing device according to the first embodiment of the present invention will be provided referring to FIGS. 1 to 7.

Figure 1:
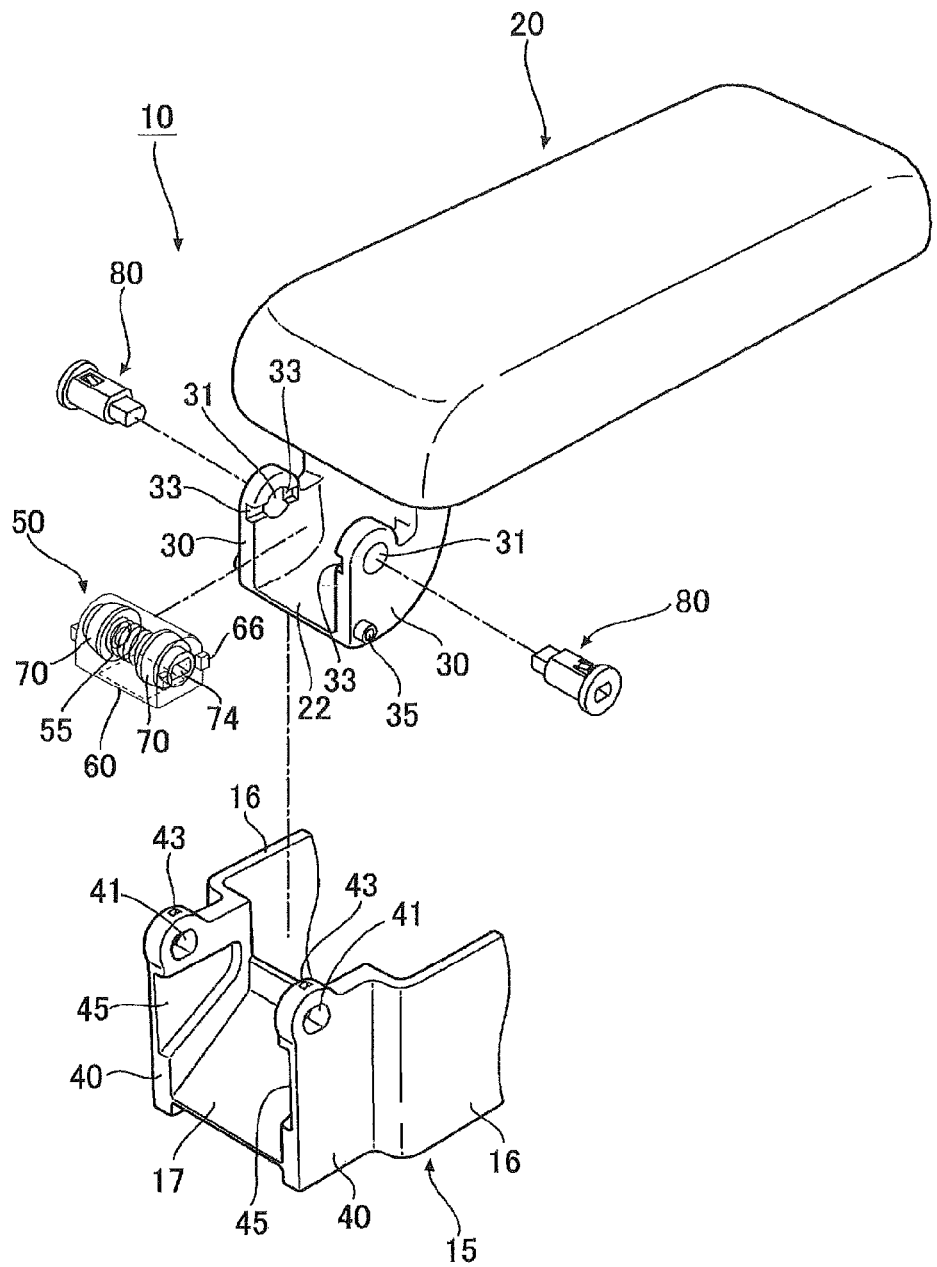
FIG. 1 is an exploded perspective view of the opening/closing device according to the first embodiment of one of the present inventions.
Figure 7:
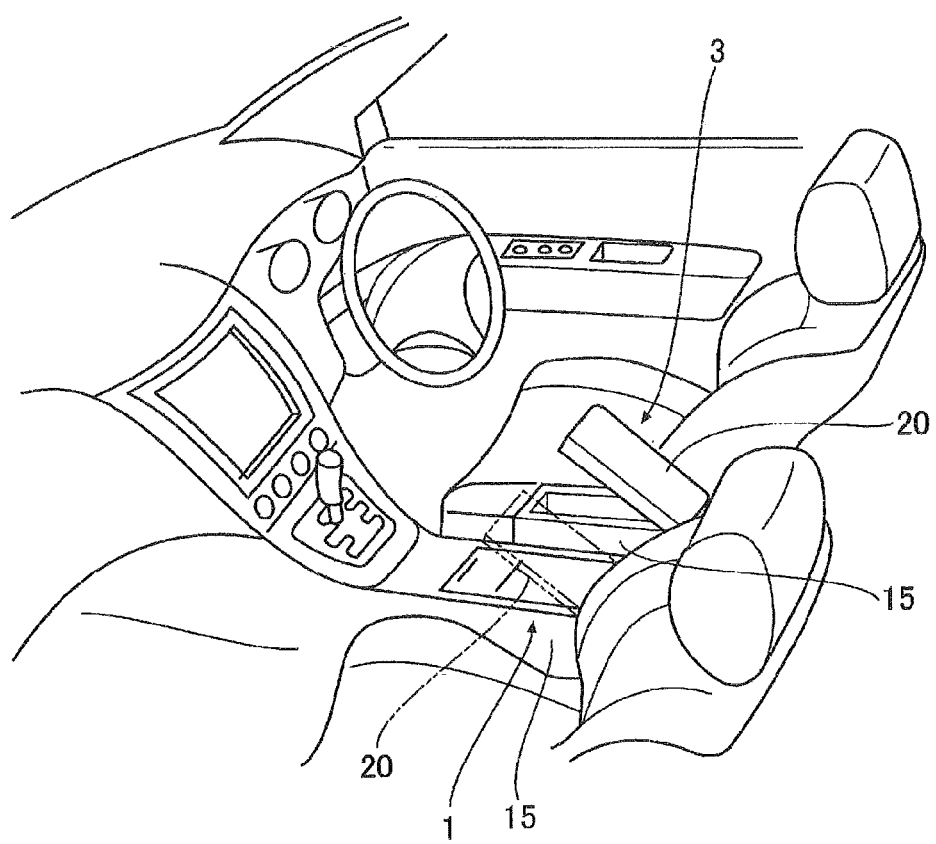
FIG. 7 is a perspective view of one example of an application site of the opening/closing device.
Figure 8:
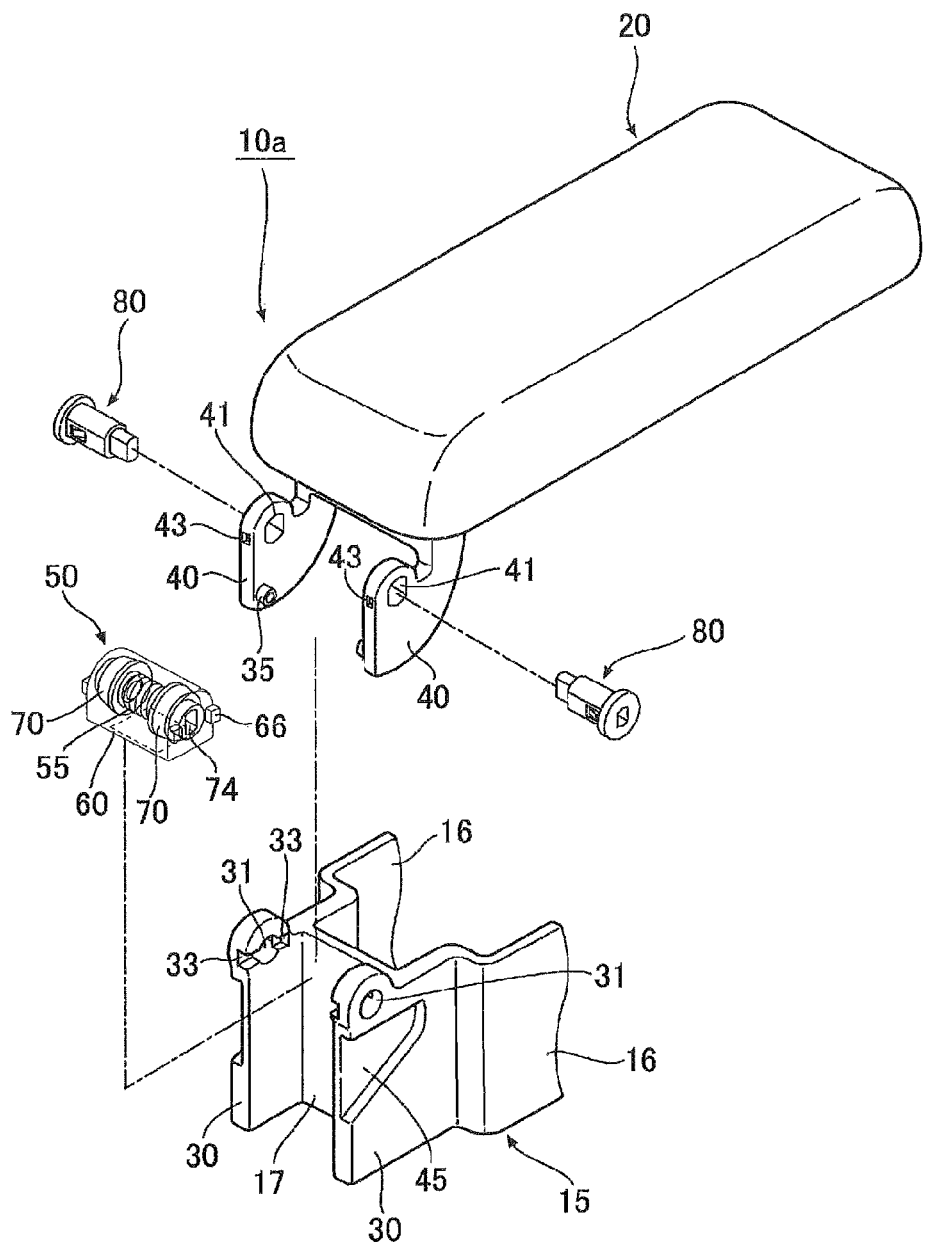
FIG. 8 is an exploded perspective view of the opening/closing device according to the second embodiment of the present invention.

As shown in FIG. 1, an opening/closing device 10 according to the present embodiment includes a fixed member 15, an opening/closing member 20 arranged to open and close the fixed member 15, and a hinge device 50 arranged to mount the opening/closing member 20 in an openable and closable manner on the fixed member 15, and is used for opening and closing operation of a center console 1 or an armrest 3 disposed between a driver seat and a passenger seat in the front side of an automobile as shown in FIG. 7. The center console 1 and the armrest 3 have a box shape extending lengthwise in a predetermined direction, and include the fixed member 15 including a housing to house small objects or the like, and the opening/closing member that defines a lid having an approximately long plate shape arranged to open and close the opening of the fixed member 15.

The opening/closing member 20 of the present embodiment includes a pair of facing inner wall portions 30, 30, and a pair of concentric pin insertion holes 31, 31 disposed in the inner wall portions 30, 30. The fixed member 15 includes a pair of facing outer wall portions 40, 40 disposed on outer sides of the inner wall portions 30, 30, and a pair of pin supporting holes 41, 41 disposed in the outer wall portions 40, 40 so as to match the pin insertion holes 31, 31 (see FIG. 1 and FIG. 5).

Figure 2:
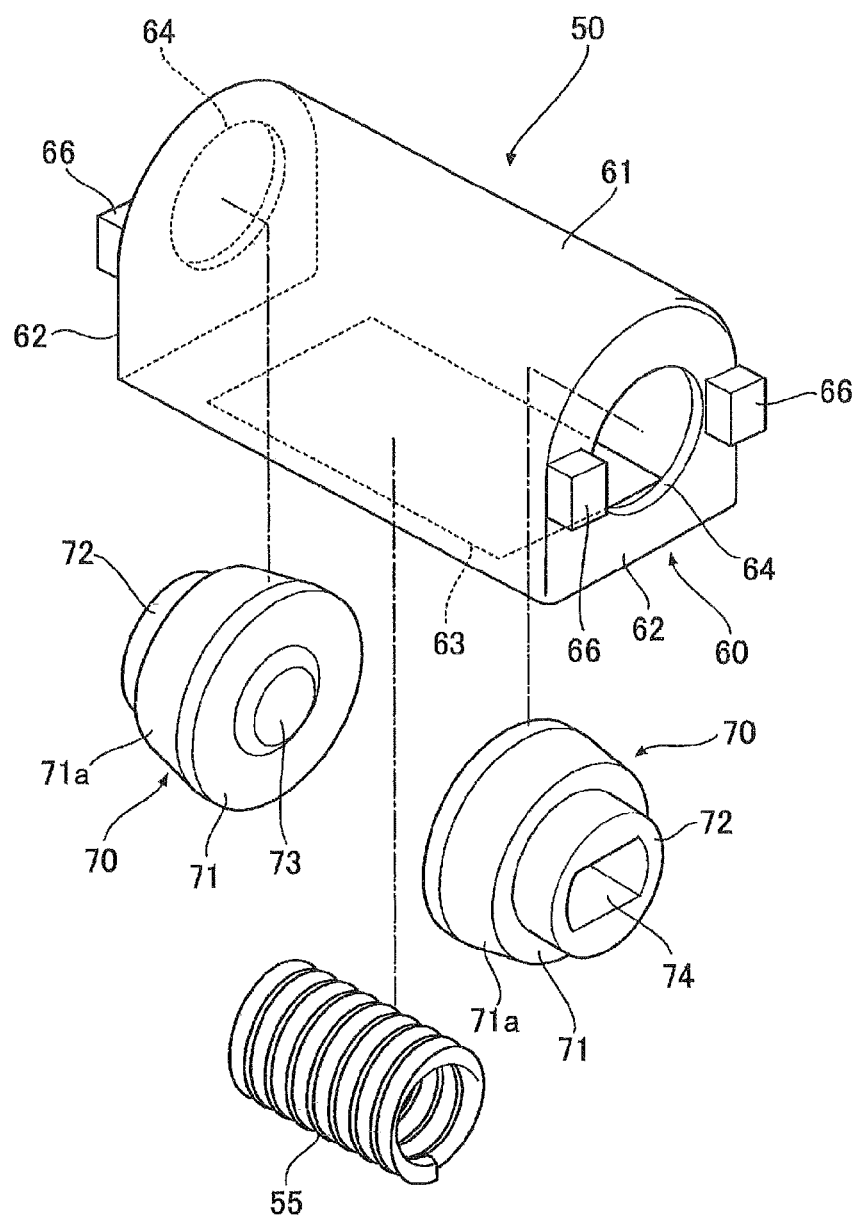
FIG. 2 is an exploded perspective view of a hinge device constituting the opening/closing device.
Figure 5:
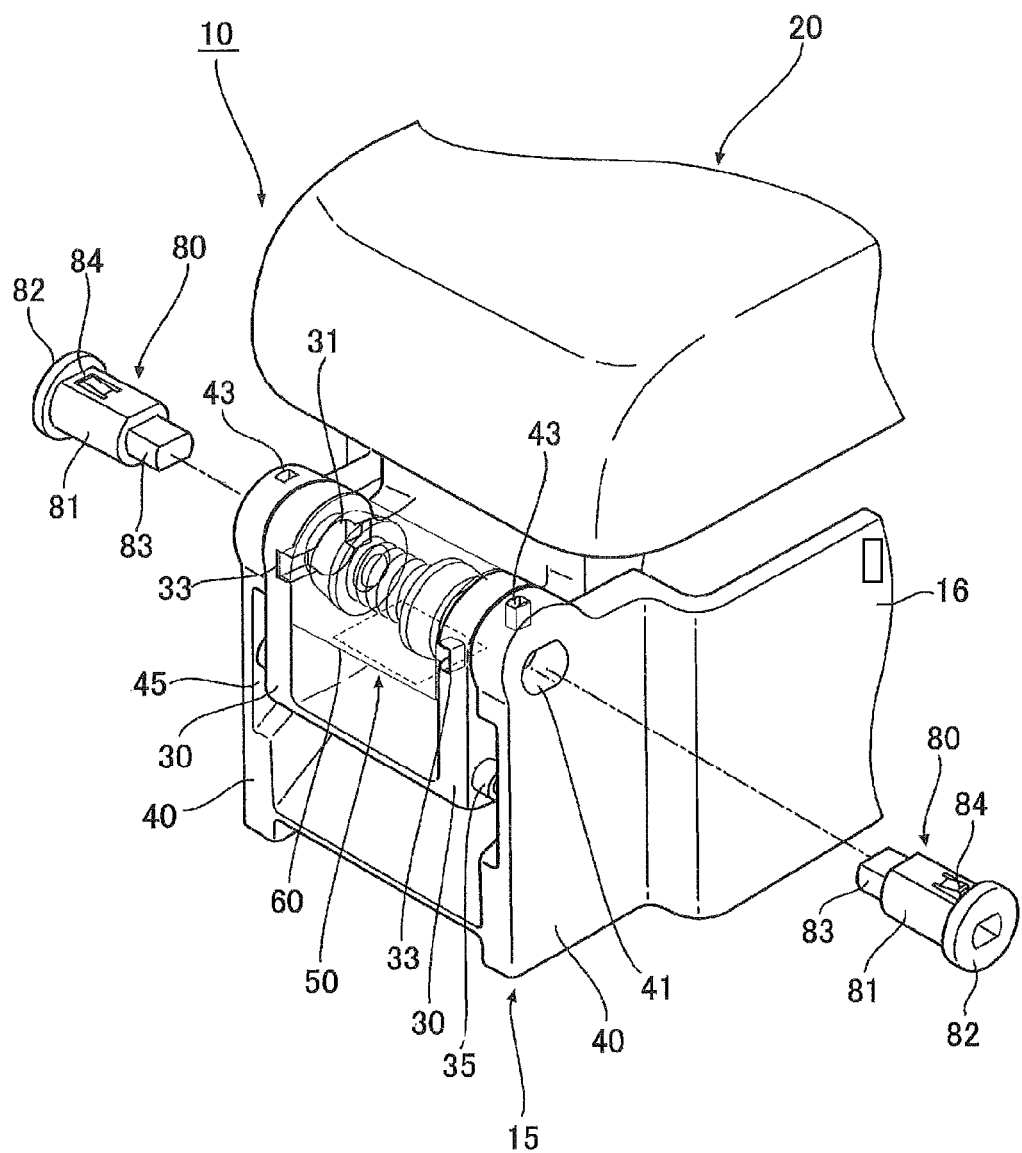
FIG. 5 is a perspective view of the opening/closing device during assembly operation.
Figure 6:
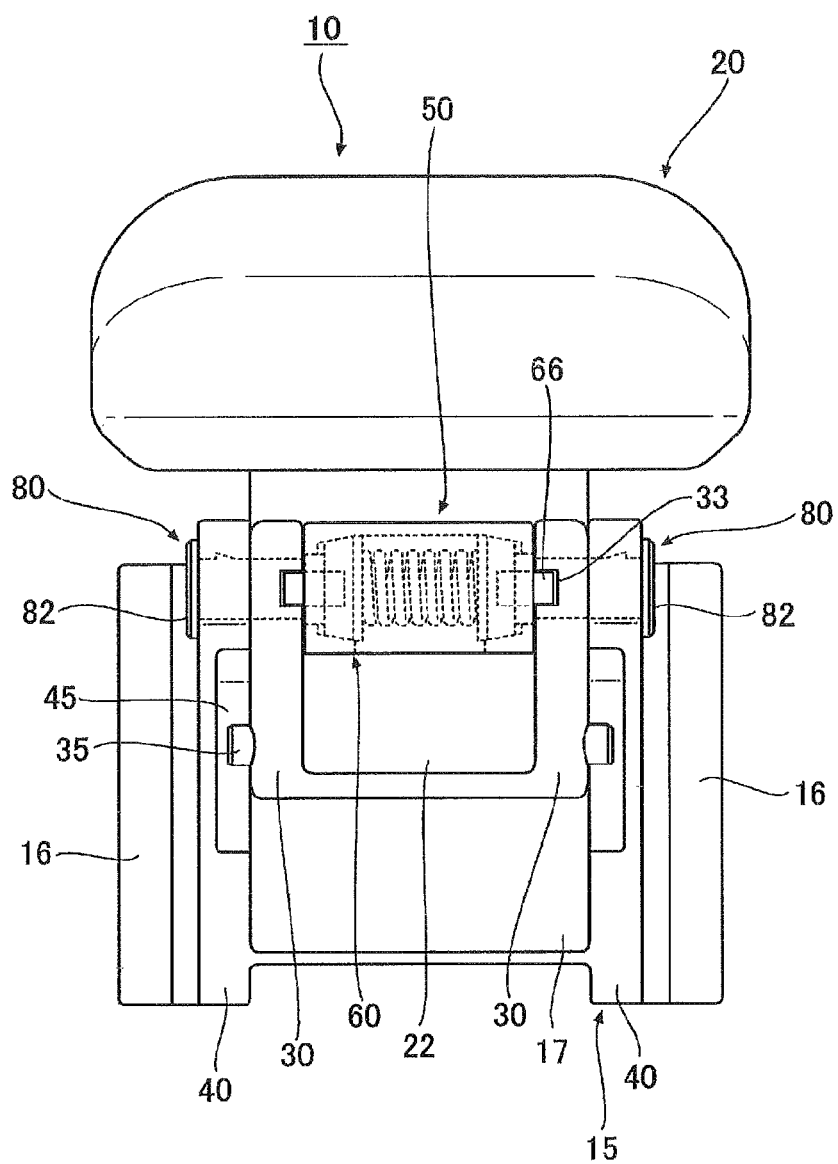
FIG. 6 is an explanatory view of the opening/closing device in an assembled state.

As shown in FIG. 2 and FIG. 5, the hinge device 50 includes a case 60 that includes axis holes 64, 64 on its both end surfaces and is inserted between the pair of facing inner wall portions 30, 30 of the opening/closing member 20 to engage to be held by the inner wall portions 30, a pair of pressure contact members 70, 70 disposed inside the case 60, individually inserted into the axis holes 64, 64, and rotationally movable with respect to the case 60, a spring 55 disposed between the pair of pressure contact members 70, 70 and arranged to press to bring the pressure contact members 70 into contact with an inner surface of the case 60, and a pair of pin members 80, 80 arranged to be inserted into the pin supporting holes 41 and the pin insertion holes 31 and engage the pressure contact members 70.

Next, a description of each member will be provided. The opening/closing member 20 that defines a lid having a long plate shape includes an intermediate wall portion 22 extending obliquely downward from the bottom surface at the base end in the longitudinal direction of the opening/closing member 20, and the pair of facing inner wall portions 30, 30 are disposed on both the sides of the intermediate wall portion 22 (see FIG. 1). The pin insertion holes 31 having a round hole shape are provided individually to the inner wall portions 30 in the upper portions at the distal ends. The pin members 80 are inserted into the pin insertion holes 31 so as to be rotationally movable (see FIG. 3 and FIG. 4B).

A pair of engaging grooves 33, 33 are provided to the inner wall portions 30, on the inner surfaces so as to be parallel to cut across the center portions of the pin insertion holes 31 (see FIG. 1). Rotationally movable stoppers 35 having a circular cylindrical shape are provided projecting from the outer surfaces in the lower portions at the distal ends of the inner wall portions 30.

The fixed member 15 having a box shape includes a pair of side walls 16, 16. The pair of outer wall portions 40, 40, between which the space is narrower in width than the space between the side walls 16, 16, and that are disposed on the outer sides of the pair of inner wall portions 30, 30 of the opening/closing member 20 are disposed at one ends of the side walls 16, 16. The side walls 16, 16 and the outer wall portions 40, 40 are connected to each other by a connecting wall 17 (see FIG. 1).

The pin supporting holes 41 having an odd-shaped hole shape are individually provided to the outer wall portions 40 in the upper portions at the distal ends (see FIG. 5). The inner peripheral surfaces on both the right and left sides of the pin supporting holes 41 of the present embodiment have a circular arc shape of fitting the inner peripheral surfaces of the pin insertion holes 31 while the inner peripheral surfaces on both the upper and lower sides of the pin supporting holes 41 have a flat shape parallel to each other, so that the pin members 80 inserted into the pin supporting holes 41 are locked. Pin engaging holes 43, 43 communicating with the pin supporting holes 41 are provided to the pin supporting holes 41 on the vertical outer peripheries of the pin supporting holes 41 in the upper portions at the distal ends of the outer wall portions 40 (see FIG. 3).

Grooves 45 for limiting rotational movement are provided to the outer wall portions 40 on the inner surfaces. The grooves 45 for limiting rotational movement have a configuration such that when the opening/closing member 20 rotationally moves at a predetermined angle or more, the rotationally movable stoppers 35 engage the end portions on the back sides of the grooves 45 for limiting rotational movement, and thereby the rotational movement angle of the opening/closing member 20 (to be specific, the opening angle of the opening/closing member 20) is limited.

As described above, the hinge device 50 includes the case 60 having a cylindrical shape and capable of housing the pair of pressure contact members 70, 70 and the spring 55. Referring also to FIG. 2, the case 60 includes a peripheral wall 61 having a half cylindrical shape, and side walls 62 disposed on both end surfaces in the longitudinal direction of the peripheral wall 61. An opening 63 having a rectangular shape is provided to the peripheral wall 61 on the lower surface, and the pair of pressure contact members 70, 70 and the spring 55 can be housed in the case 60 via the opening 63.

Figure 3:
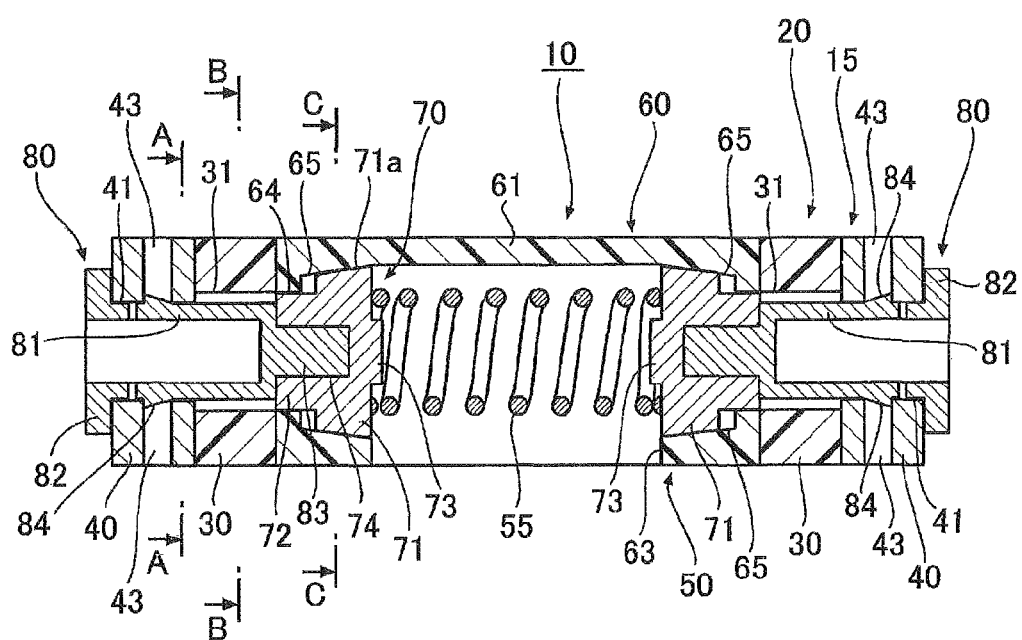
FIG. 3 is a cross-sectional view of the opening/closing device.

The axis holes 64, 64 having a round hole shape and arranged to match the pin supporting holes 41 of the outer wall portions 40 and the pin insertion holes 31 of the inner wall portions 30 when the case 60 is inserted between the pair of inner wall portions 30 and made to engage the pair of inner wall portions 30. As shown in FIG. 3, pressure contact surfaces 65 having a tapered shape increasing in diameter gradually inward the case are provided to the case 60 on the inner peripheral edges of the axis holes 64 on the inner peripheries on both the ends in the longitudinal direction of the case 60.

Engaging protruding portions 66, 66 are provided projecting on both the front and back sides of the axis holes 64 on the outer surfaces of the side walls 62. Thus, the case 60 is inserted between the pair of inner wall portions 30, 30, and the engaging protruding portions 66, 66 are made to engage the engaging grooves 33, 33, and thereby the case 60 can be held in the state of being locked between the inner wall portions 30, 30 (see FIG. 5 and FIG. 6).

Each of the pressure contact members 70 disposed inside the case 60 includes a base portion 71 having an approximately disk shape, a protruding portion 72 protruding from the center of one end surface of the base portion 71 so as to have a circular protruding shape and arranged to be inserted so as to be rotationally movable into the axis hole 64 of the case 60, and a supporting protruding portion 73 protruding from the center of the other end surface of the base portion 71 and arranged to support one end of the spring 55.

A pressure contact surface 71*a* having a tapered shape decreasing in diameter gradually toward the distal end of the protruding portion 72 from the bottom surface of the base portion 71 is provided on the outer periphery of each base portion 71. Thus, the pair of pressure contact members 70, 70 disposed inside the case 60 are pressed in the direction away from each other toward the outside of the case 60 by the biasing force of the spring 55, and the pressure contact surfaces 71*a* of the pressure contact members 70 are pressed to be brought into contact with the pressure contact surfaces 65 on the inner peripheries at both the ends of the case 60 (see FIG. 3).

Engaging concave portions 74 having an odd-shaped hole shape, which the pin members 80 engage, are provided having a depth from the distal ends of the protruding portion 72 to reach a midpoint in the direction of the thickness of the base portions 71 (see FIG. 2 and FIG. 3). The engaging concave portions 74 of the present embodiment have long holes of which both the ends have a circular arc shape, and have long sides having the shape of facing parallel flat surfaces.

The pin members 80 inserted into the pin supporting holes 41 of the outer wall portions 40 and the pin insertion holes 31 of the inner wall portions 30 from the outer sides of the outer wall portions 40 of the fixed member 15 include axis portions 81 arranged to rotationally move the fixed member 15 and the opening/closing member 20 relatively (see FIG. 5).

As shown in FIG. 5, the axis portions 81 of the present embodiment have a pair of opposite peripheral surfaces having a circular arc shape so as to match the circular arc shaped inner peripheral surfaces of the pin insertion holes 31 and the pin supporting holes 41 while having a pair of peripheral surfaces, which are perpendicular to the circular arc shaped opposite peripheral surfaces, that have a flat shape parallel to each other so as to match the flat inner peripheral surfaces of the pin supporting holes 41. The axis portions 81 are inserted into the pin supporting holes 41 of the outer wall portions 40 while being locked (see FIG. 4A) while inserted into the pin insertion holes 31 of the inner wall portions 30 so as to be rotationally movable (see FIG. 3 and FIG. 4B).

Flanges 82 arranged to engage the peripheral edges on the outer surfaces of the pin supporting holes 41 of the outer wall portions 40 are provided to the axis portions 81 on the outer peripheries at the base end portions.

Engaging protruding portions 83 having a pair of opposite side surfaces having a flat shape parallel to each other are provided projecting from the distal end sides of the axis portions 81 so as to match the engaging concave portions 74 of the pressure contact members 70. The engaging protruding portions 83 are inserted into to engage the engaging concave portions 74, and thereby the pin members 80 are connected to the pressure contact members 70 while being locked (see FIG. 3 and FIG. 4C).

Engaging pawls 84 that are flexible via slits having the shape of the letter "U" are provided to the axis portions 81 at the base ends on the opposite flat peripheral surfaces. The engaging pawls 84 are arranged to, when the axis portions 81 are inserted into the pin supporting holes 41 of the fixed member 15, engage the pin engaging holes 43 of the outer wall portions 40 to be retained and held with respect to the pin supporting holes 41 of the outer wall portions 40 (see FIG. 3).

That is, the engaging pawls 84 of the pin members 80 and the pin engaging holes 43 of the outer wall portions 40 define a "retaining structure" arranged to hold the pin members with respect to the outer wall portions that is disposed between the pin members and the outer wall portions in the present invention.

Next, a description of usage, and operation and effect of the opening/closing device 10 having the above-described configuration will be provided.

First, as shown in FIG. 2, while the pair of pressure contact members 70, 70 are individually inserted into the case 60 via the opening 63 of the case 60, and the protruding portion 72 of the pressure contact members 70 are made to come out from the axis holes 64, the spring 55 is compressed and inserted into the case 60 via the opening 63, and disposed between the pair of pressure contact members 70, 70, and both the ends of the spring 55 are made to be held by the supporting protruding portions 73, 73 (see FIG. 3).

Then, the pressure contact members 70 are individually pressed toward the outside of the case by the biasing force of the spring 55, and the pressure contact surfaces 71a of the pressure contact members 70 are pressed to be brought into contact with the pressure contact surfaces 65 on the inner peripheries at both the ends of the case 60, and thus the pair of pressure contact members 70, 70 and the spring 55 can be set in advance in the case 60.

When the elastic force of the spring 55 is strong, the spring ends may be compressed with the use of a jig to decrease the entire length of the spring 55 to house the spring 55 in the case 60, and then the spring length may be made elastically returned by removing the jig, and both the ends of the spring 55 may be supported by the supporting protruding portions 73 of the pressure contact members 70.

Next, while the engaging protruding portions 66 of the case 60 are made to match the engaging grooves 33 of the inner wall portions 30 of the opening/closing member 20, the case 60 is inserted between the pair of inner wall portions 30, 30 of the opening/closing member 20, and thereby the engaging protruding portions 66 are made to individually engage the engaging grooves 33. Thus, the case 60 is mounted on the opening/closing member 20 while being locked thereto, while the engaging concave portions 74 of the pressure contact members 70 match the pin insertion holes 31 of the inner wall portions 30.

Then, the case 60 that engages to be held between the pair of inner wall portions 30, 30 of the opening/closing member 20 are inserted between the pair of outer wall portions 40, 40 of the fixed member 15, and the pin insertion holes 31 of the inner wall portions 30 and the engaging concave portions 74 of the pressure contact members 70 are made to match the pin supporting holes 41 of the outer wall portions 40.

In this state, the flat peripheral surfaces of the axis portions 81 of the pin members 80 are made to match the flat inner peripheral surfaces of the pin supporting holes 41, and the pin members 80 are inserted to be pushed into the pin supporting holes 41 from the outer sides of the outer wall portions 40 of the fixed member 15 as shown in FIG. 5.

Then, the axis portions 81 of the pin members 80 pass through the pin supporting holes 41 of the outer wall portions 40 to be inserted into the pin insertion holes 31 of the inner wall portions 30 while the engaging protruding portions 83 of the pin members 80 engage the engaging concave portions 74 of the pressure contact members 70 in the case 60 (see FIG. 3). Further, the engaging pawls 84 of the pin members 80 engage the pin engaging holes 43 of the outer wall portions 40 while the flanges 82 of the pin members 80 engage the peripheral edges on the outer surfaces of the pin supporting holes 41 of the outer wall portions 40 (see FIG. 3).

As a result, the pin members 80 engage the pin supporting holes 41 of the outer wall portions 40 of the fixed member 15 while locked and retained with respect to the pin supporting holes 41. The pin members 80 are made rotationally movable with respect to the pin insertion holes 31 of the inner wall portions 30 of the opening/closing member 20. The pin members 80 and the pressure contact members 70 are connected to each other while locked, and thereby the opening/closing member can be mounted in an openable and closable manner on the fixed member 15 (see FIG. 3 and FIG. 6).

As described above, in the opening/closing device 10, it is possible to mount the opening/closing member 20 in an openable and closable manner on the fixed member 15 by easy operation of only inserting the case 60, in which the pair of pressure contact members 70, 70 and the spring 55 are set in advance, between the pair of inner wall portions 30, 30 to make the case 60 engage the pair of inner wall portions 30, 30, inserting the pair of pin members 80, 80 individually into the pin supporting holes 41 and the pin insertion holes 31 from the outer sides of the pair of outer wall portions 40, 40 in this state, and making the pin members 80, 80 engage the pressure contact members 70, 70 in the case 60. Thus, assembly workability can be improved.

Because the engaging pawls 84 of the pin members 80 and the pin engaging holes 43 of the outer wall portions 40 are used as a retaining structure in the present embodiment, the following action and effect can be obtained.

To be specific, inserting the pin members 80 into the pin supporting holes 41 and the pin insertion holes 31 from the outer sides of the pair of outer wall portions 40 and making the pin members 80, 80 engage the pressure contact members 70 while inserting the case 60 between the inner wall portions 30, 30 to make the case 60 engage the inner wall portions 30 as described above allows the engaging pawls 84 of the pin members 80 to engage the pin engaging holes 43 of the outer wall portions 40, and thereby the pin members 80 are locked with respect to the outer wall portions 40. Thus, it is unnecessary to fix the case 60 to the fixed member 15 or the opening/closing member 20 with the use of a bolt, a screw, or the like, and assembly workability can be more improved.

Figure 4A:
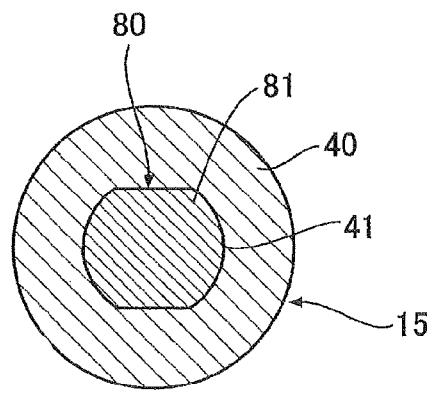
FIG. 4A is a cross-sectional view taken along the arrow line A-A of FIG. 3.
Figure 4B:
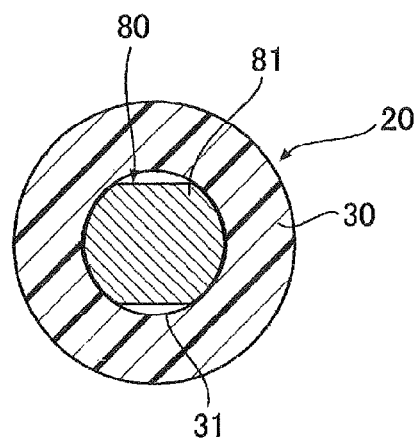
FIG. 4B is a cross-sectional view taken along the arrow line B-B of FIG. 3.
Figure 4C:
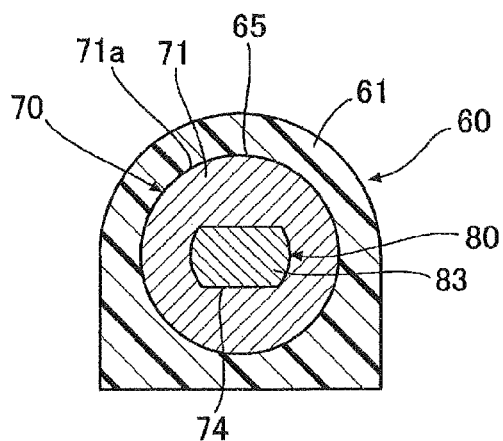
FIG. 4C is a cross-sectional view taken along the arrow line C-C of FIG. 3.

In the present embodiment, the pin members 80 are locked with respect to the pin supporting holes 41 of the outer wall portions 40 while made rotationally movable with respect to the pin insertion holes 31 of the inner wall portions 30 (see FIG. 3, FIG. 4A, and FIG. 4B).

Thus, when the opening/closing member 20 opens and closes to the fixed member 15, and the inner wall portions 30 of the opening/closing member 20 rotationally move with respect to the outer wall portions 40 of the fixed member 15, the case 60 engaged to be held between the inner wall portions 30, 30 of the opening/closing member 20 rotationally moves in an integrated fashion while the pin members 80 supported by the pin supporting holes 41 of the outer wall portions 40 of the fixed member 15 and the pressure contact members 70 connected to the pin members 80 do not rotationally move, so that the case 60 and the pressure contact members 70 rotationally move relatively.

As a result, a frictional force generated by a pressure contact force by the spring 55 is imparted between the pressure contact surfaces 71a of the pressure contact members 70 and the pressure contact surfaces 65 of the case 60. Thus, by adjusting the pressure contact force by the spring 55, for example, a free-stop function can be imparted that is capable of stopping the opening/closing member 20 at a given opening angle when the opening/closing member 20 is closed again from the state of being opened from the box-shaped fixed member 15, or a braking force can be imparted that is capable of slowly closing the opening/closing member 20 that is being opened without suddenly closing the opening/closing member 20.

The opening/closing device according to the second embodiment of the present invention is shown in FIGS. 8 to 11. The same reference numerals are provided to the constituent elements that are substantially same as those in the above-described embodiment, and explanations of these constituent elements are omitted.

An opening/closing device 10a according to the present embodiment includes the pair of facing outer wall portions 40, 40 provided to the opening/closing member 20, and the pair of inner wall portions 30, 30 provided to the fixed member 15, which are different from the first embodiment.

To be specific, the pair of inner wall portions 30, 30 that include the pin insertion holes 31, 31 having a round hole shape are provided to the side walls 16, 16 of the fixed member 15 at one ends. The pair of inner wall portions 30, 30 are connected to each other by the connecting wall 17. The grooves 45 for limiting rotational movement are provided to the inner wall portions 30 on the outer surfaces.

The pair of outer wall portions 40, 40 that are parallel to each other extend from the bottom surface at the base end in the longitudinal direction of the opening/closing member 20 while having a space fitting the width between the pair of inner wall portions 30, 30. The pin supporting holes 41 having an odd-shaped hole shape of which the inner peripheral surfaces on both the right and left sides have a flat shape parallel to each other are provided to the outer wall portions 40 in the upper portions at the distal ends. The pin engaging holes 43, 43 communicating with the pin supporting holes 41 are individually provided to the outer wall portions 40 on both the side surfaces in the upper portions at the distal ends. The rotationally movable stoppers 35 having a circular cylindrical shape are provided projecting from the inner surfaces in the lower portions at the distal ends of the outer wall portions 40.

Then, in the present embodiment, the fixed member 15 and the opening/closing member 20 can be assembled as follows, for example.

To be specific, the engaging protruding portions 66, 66 of the case 60 housing the pair of pressure contact members 70, 70 and the spring 55 are made to match the engaging grooves 33 of the inner wall portions 30 of the fixed member 15, the case 60 is inserted between the pair of inner wall portions 30, 30 to be made to engage the inner wall portions 30, and the case 60 is mounted on the fixed body 15 while locked. Then, the pair of outer wall portions 40, 40 of the opening/closing member 20 are disposed on the outer sides of the pair of inner wall portions 30, 30 of the fixed member 15, and thereby the pin supporting holes 41 are made to match the pin insertion holes 31.

Figure 9:
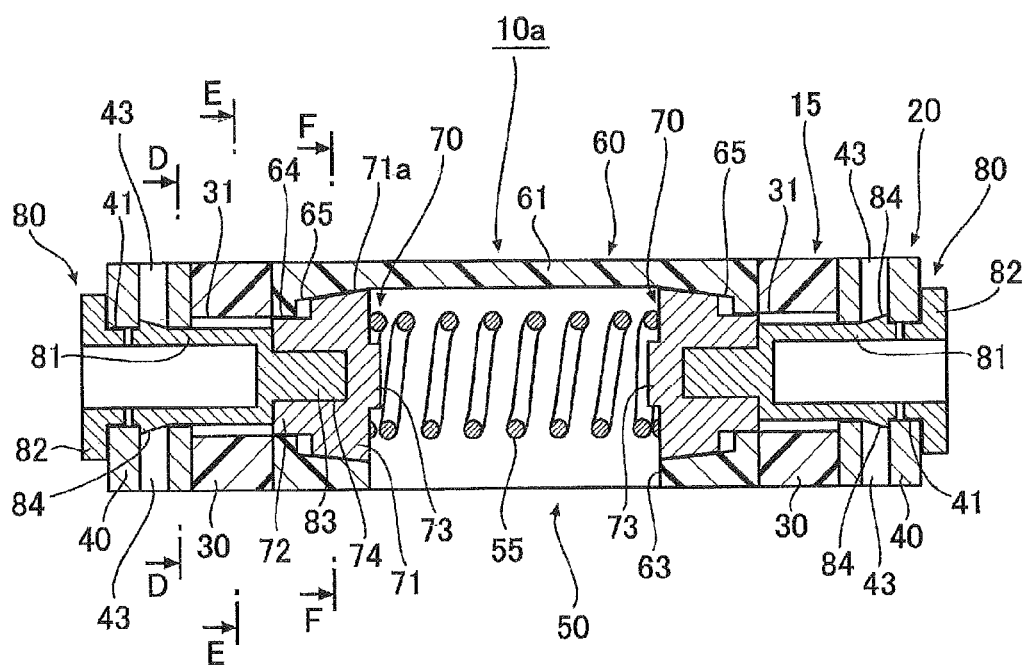
FIG. 9 is a cross-sectional view of the opening/closing device.
Figure 11:
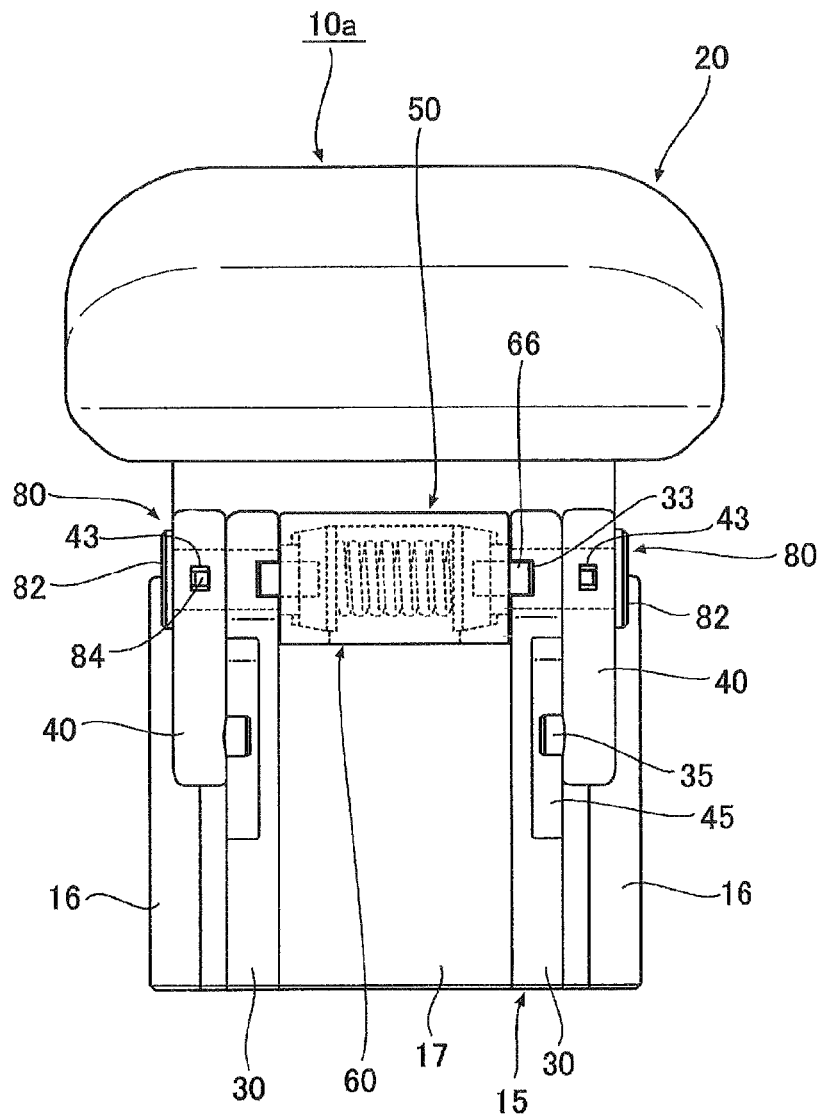
FIG. 11 is an explanatory view of the opening/closing device in an assembled state.

In this state, when the axis portions 81 of the pin members 80 are inserted into the pin supporting holes 41 and the pin insertion holes 31 of the inner wall portions 30 from the outer sides of outer wall portions 40 of the opening/closing member 20, the engaging protruding portions 83 of the pin members 80 engage the engaging concave portions 74 of the pressure contact members 70 while the engaging pawls 84 of the pin members 80 engage the pin engaging holes 43 of the outer wall portions 40, and the flanges 82 of the pin members 80 engage the peripheral edges on the outer surfaces of the pin supporting holes 41 of the outer wall portions 40 (see FIG. 9 and FIG. 11).

Figure 10A:
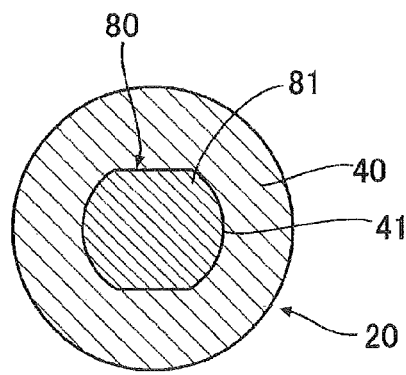
FIG. 10A is a cross-sectional view taken along the arrow line D-D of FIG. 9.
Figure 10B:
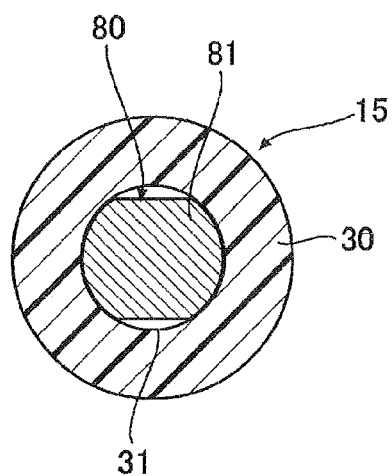
FIG. 10B is a cross-sectional view taken along the arrow line E-E of FIG. 9.
Figure 10C:
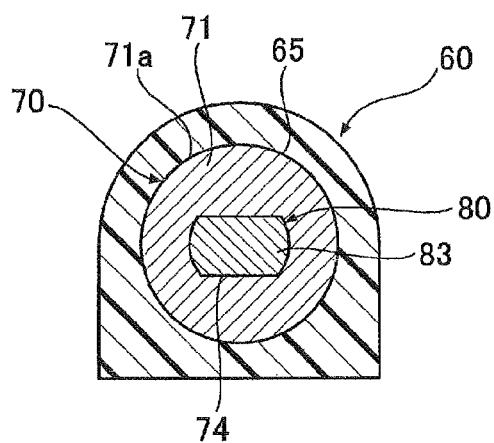
FIG. 10C is a cross-sectional view taken along the arrow line F-F of FIG. 9.

As a result, the pin members 80 engage the pin supporting holes 41 of the outer wall portions 40 of the opening/closing member 20 while locked and retained with respect to the pin supporting holes 41 (see FIG. 10A). The pin members 80 are made rotationally movable with respect to the pin insertion holes 31 of the inner wall portions 30 of the fixed member 15 (see FIG. 10B). The pin members 80 and the pressure contact members 70 are connected to each other while locked, and thereby the opening/closing member 20 can be mounted in an openable and closable manner on the fixed member 15 (see FIG. 11).

Then, when the opening/closing member 20 opens and closes to the fixed member 15, and the outer wall portions 40 of the opening/closing member 20 rotationally move with respect to the inner wall portions 30 of the fixed member 15, the pin members 80 supported by the pin supporting holes 41 of the outer wall portions of the opening/closing member 20 and the pressure contact members 70 connected to the pin members 80 rotationally move in an integrated fashion with the opening/closing member 20 while the case 60 engaged to be held between the inner wall portions 30, 30 of the fixed member 15 does not rotationally move, so that the case 60 and the pressure contact members 70 rotationally move relatively. Thus, a braking force generated by a pressure contact force and a frictional force by the spring 55 can be imparted between the pressure contact surfaces 71a of the pressure contact members 70 and the pressure contact surfaces 65 of the case 60.

Figure 12:
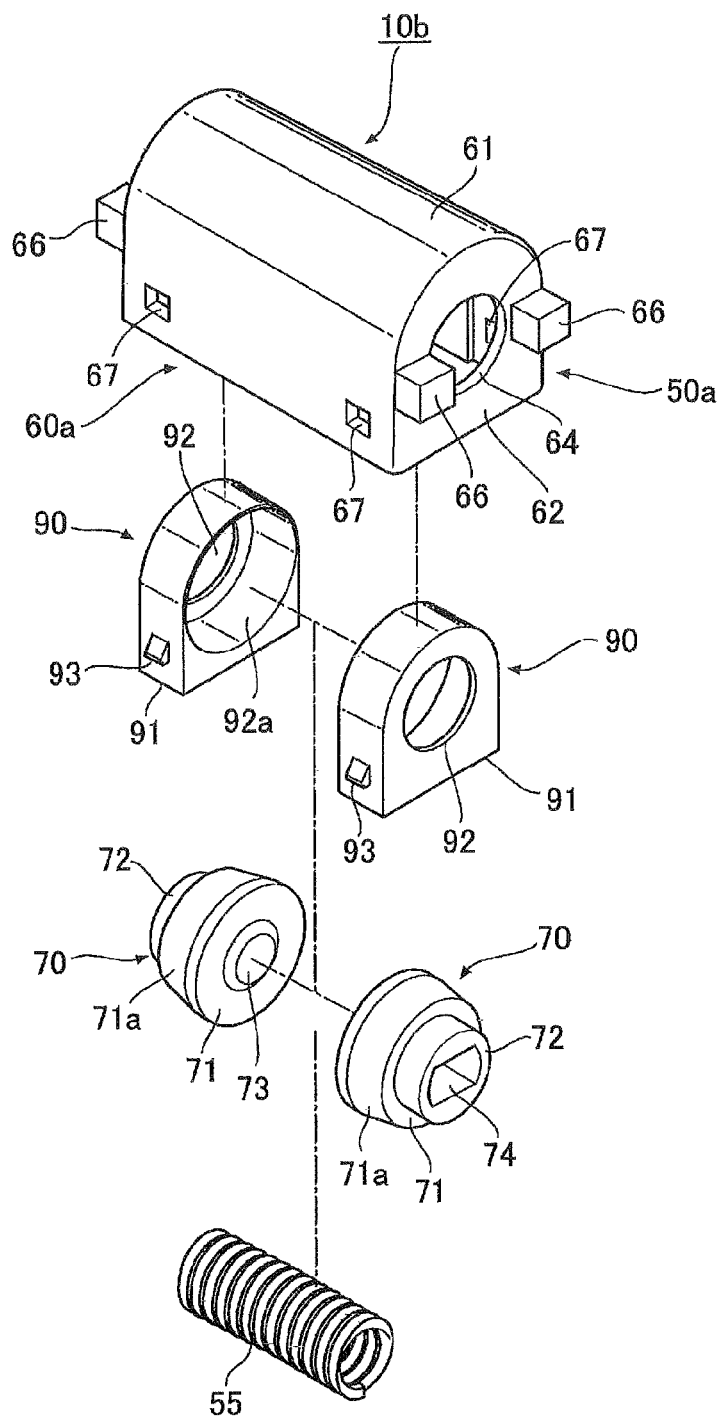
FIG. 12 is an exploded perspective view of the opening/closing device according to the third embodiment of the present invention.
Figure 13:
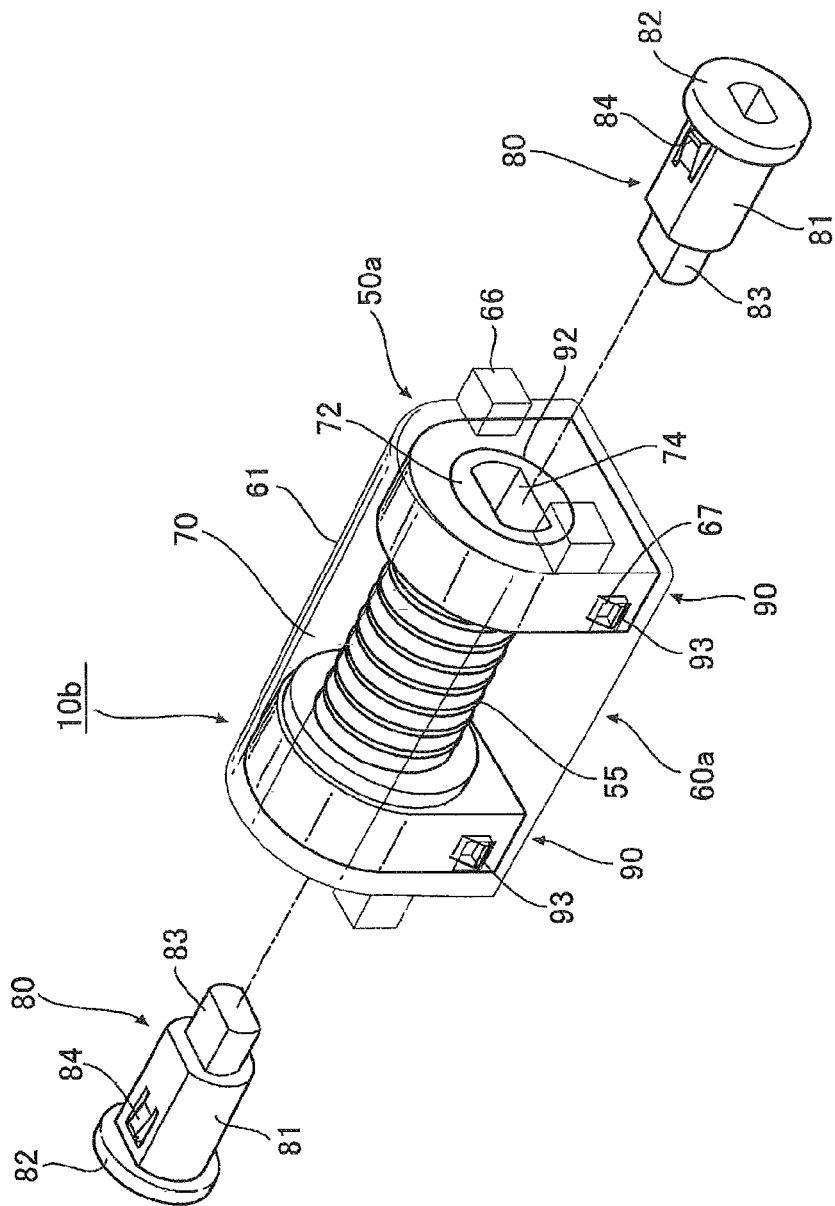
FIG. 13 is a perspective view of the opening/closing device.

The opening/closing device according to the third embodiment of the present invention is shown in FIG. 12 and FIG. 13. The same reference numerals are provided to the constituent elements that are substantially same as those in the above-described embodiments, and explanations of these constituent elements are omitted.

An opening/closing device 10b according to the present embodiment is different in the structure of the hinge device from the above-described first and second embodiments.

To be specific, a hinge device 50a of this embodiment includes a case 60a having a cylindrical shape and capable of housing the pair of pressure contact members 70, 70 and the spring 55. Holding members 90, 90 that are members separate from the case 60a are arranged to be individually mounted on both the inner ends of the case 60a.

As shown in FIG. 12, the holding members 90 include main bodies 91 having a frame shape fitting the inner shape of the case 60a and arranged to support the pressure contact members 70 so as to be rotationally movable. Insertion holes 92 communicating with the axis holes 64 of the case 60a are provided to the main bodies 91 on one end surfaces.

Pressure contact surfaces 92a having a tapered shape increasing in diameter gradually toward the other end surfaces of the main bodies 91 are provided from the inner peripheral edges of the insertion holes 92. The pressure contact surfaces 71a of the pressure contact members 70 pressed by the sprig 55 are pressed to be brought into contact with the pressure contact surfaces 92a, and a braking force is imparted to the pressure contact surfaces 92a.

Engaging protruding portions 93, 93 are individually provided to the main bodies 91 on both the side surfaces, and arranged to individually engage a pair of engaging holes 67, 67 provided to the case 60 on both the side surfaces at both the ends in the longitudinal direction of the peripheral wall 61. Thus, the holding members 90, 90 are mounted on both the inner ends of the case 60 (see FIG. 13).

With the present embodiment, being separate from the case 60a, the holding members 90 can be made from a material different from the material of the case 60a. With this configuration, the surface accuracy of the pressure contact surfaces 92a with which the pressure contact members 70 or pin-formed pressure contact members 75 to be described later are pressed to be brought into contact can be improved, and the wear resistance or the smoothness of the pressure contact surfaces 92a can be improved. Thus, opening and closing operation of the opening/closing member 20 can be performed smoothly, which can reduce variation in braking force.

By making the holding members 90 separate from the case 60a, the inner peripheries of the insertion holes 92 of the holding members 90 can be made to have a shape matched with purposes such as a tapered shape without using a complicated mold or the like. Thus, the pressure contact members 70 or the pin-formed pressure contact members 75 to be described later can be pressed to be brought into contact with the pressure contact surfaces 92a provided on the inner peripheries of the insertion holes 92, and thereby the breaking force can be more improved.

When the inner surfaces at both the ends of the case are made to have a tapered shape, a piece that slides along the axis direction of the case and also slides in a direction crossing the axis direction is required; however, in the present embodiment, because the holding members 90 are separate from the case 60a, the piece is not required, and as a result, the size in the axis direction of the case 60a can be reduced, which allows the hinge device 50a to be downsized.

The opening/closing device according to one embodiment of the other one of the present inventions is shown in FIGS. 14 to 18. The same reference numerals are provided to the constituent elements that are substantially same as those in the above-described embodiments, and explanations of these constituent elements are omitted.

An opening/closing device 10c according to the present embodiment is different from the above-described first to third embodiments. In the opening/closing device 10c, the pressure contact members 70 and the pin members 80 are not provided so as to be separate from each other, but a hinge 50b is provided that includes a pair of pin-formed pressure contact members 75 that correspond to the pressure contact members 70 and the pin members 80 that are of a monolithic construction.

The fixed member 15 and the opening/closing member 20 of the present embodiment have basically the same structures as the first embodiment shown in FIGS. 1 to 7. The pair of facing outer wall portions 40, 40 including the pin supporting holes 41 having a round hole shape are provided to the fixed member 15, and the pair of inner wall portions 30, 30 including the pin insertion holes 31 are provided to the opening/closing member 20.

Figure 14:
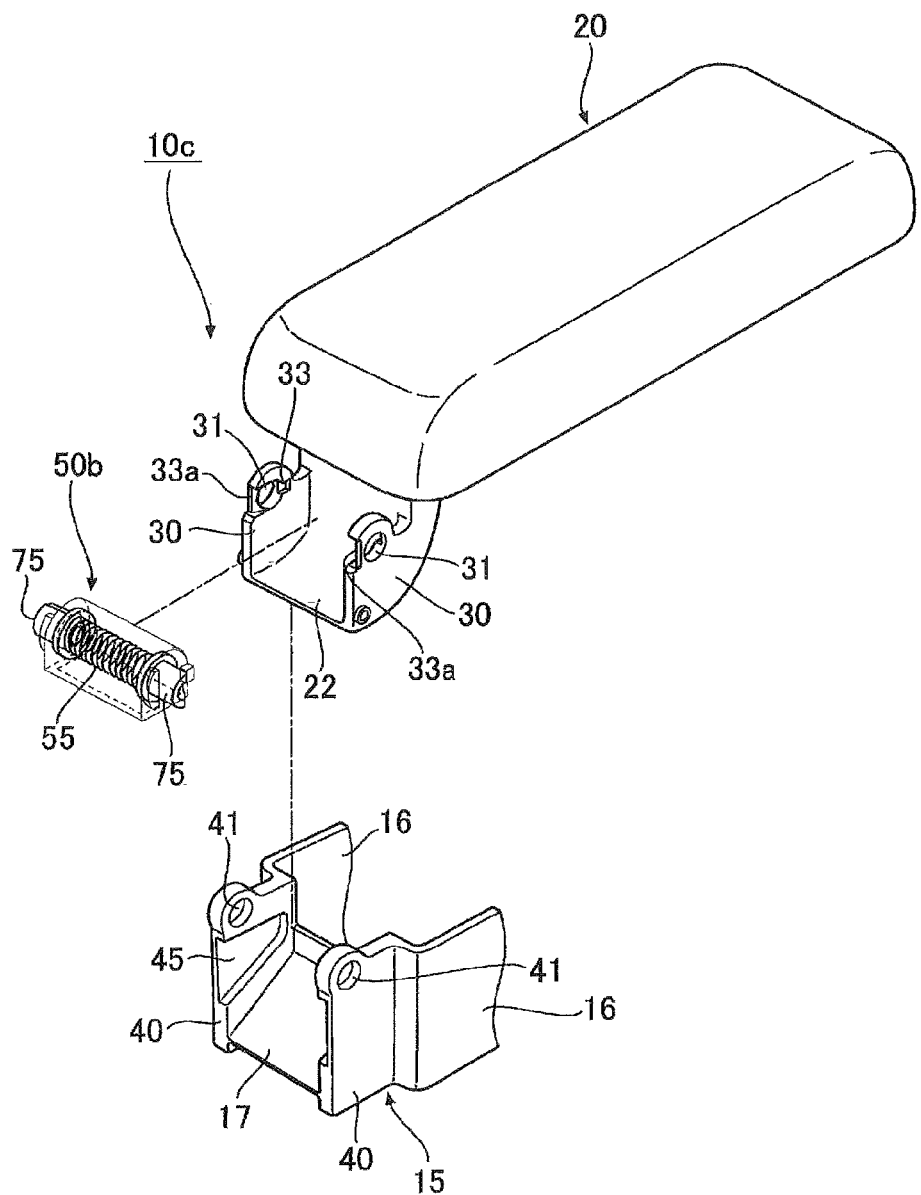
FIG. 14 is an exploded perspective view of the opening/closing device according to one embodiment of the other one of the present inventions.
Figure 16:
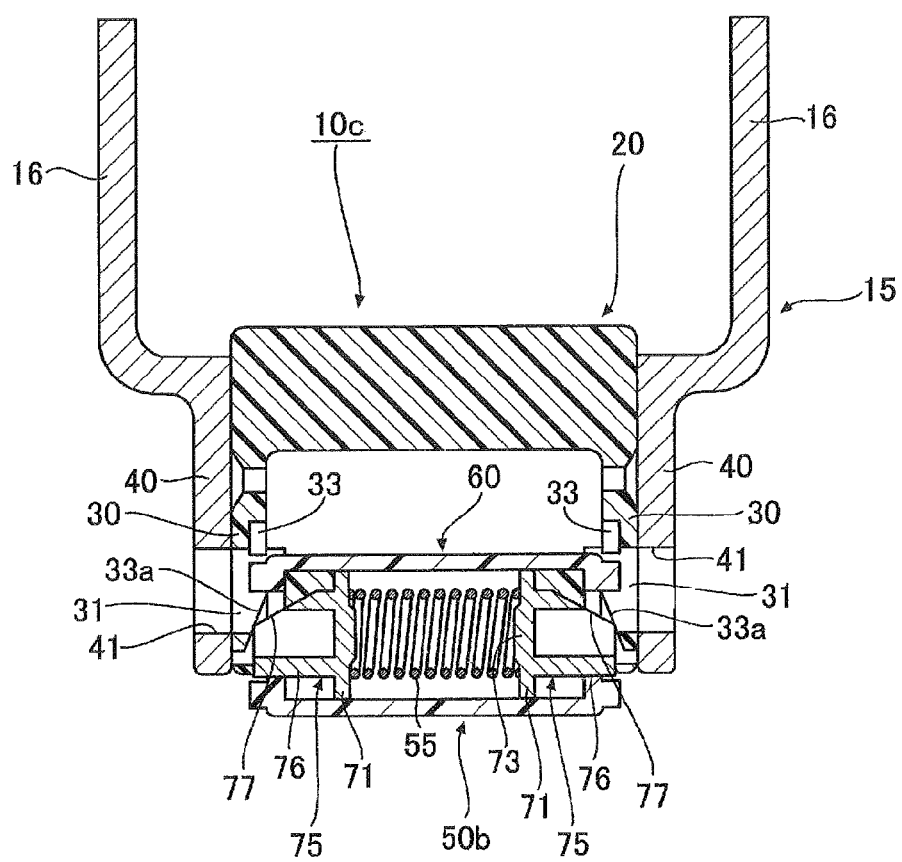
FIG. 16 is a cross-sectional view of the opening/closing device during assembly operation.
Figure 17:
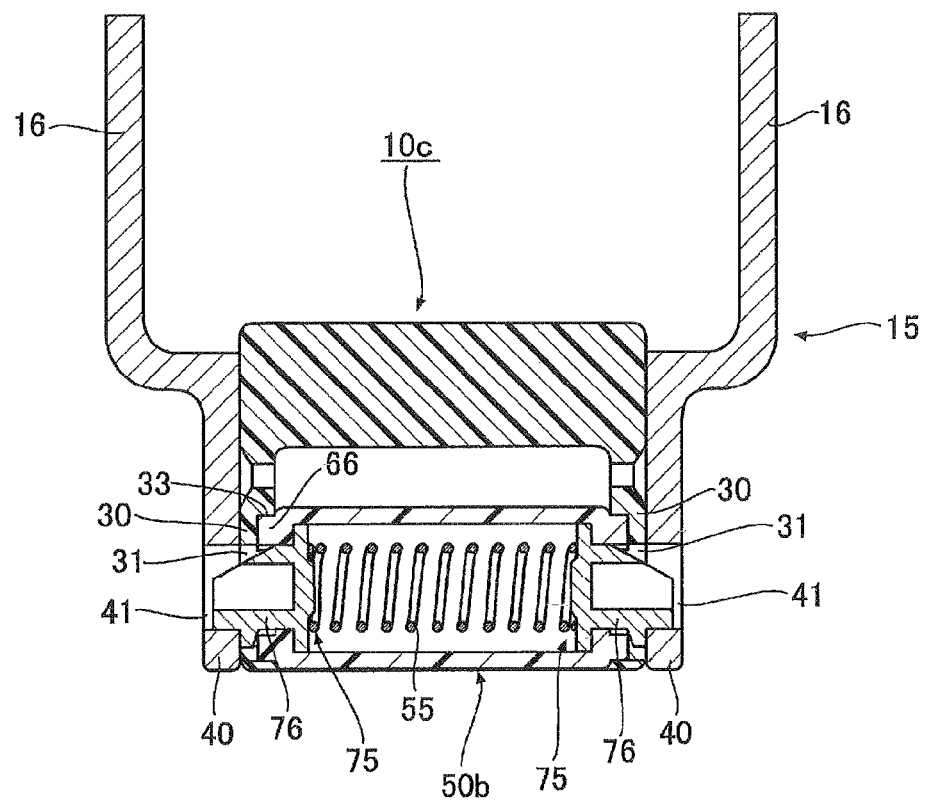
FIG. 17 is a cross-sectional view of the opening/closing device in an assembled state.
Figure 18:
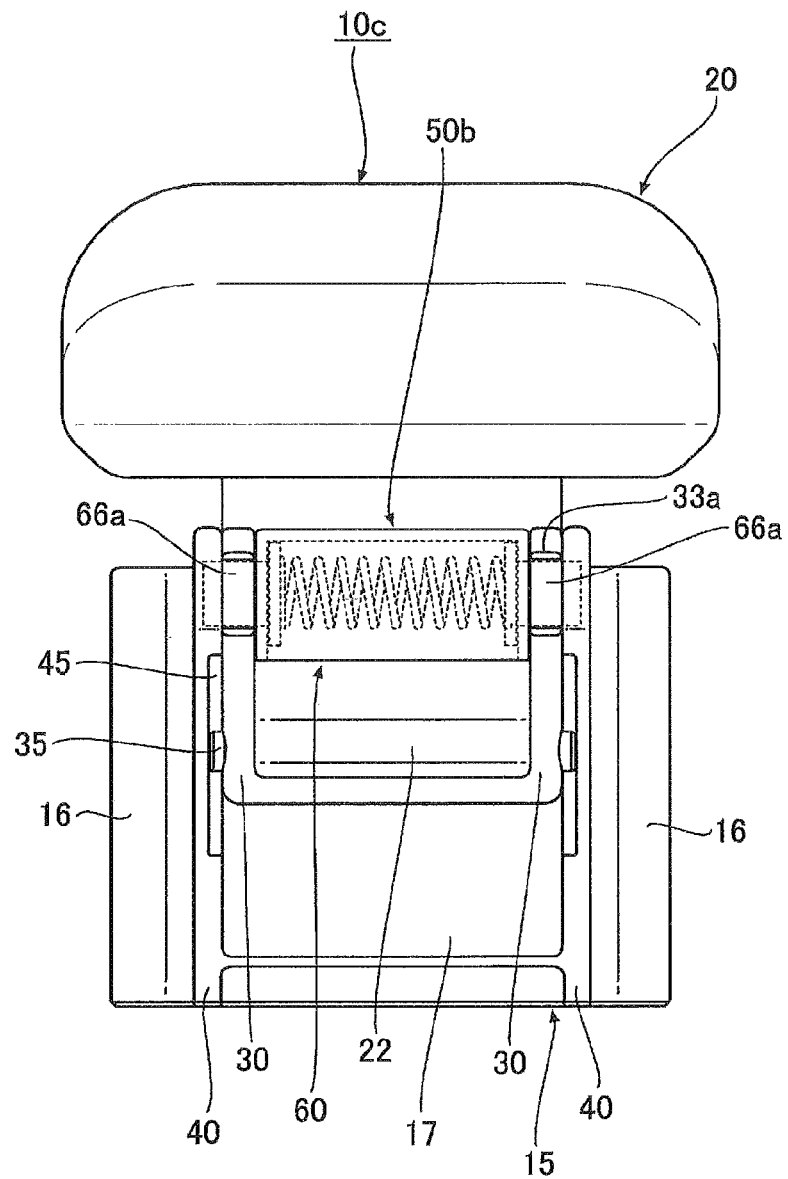
FIG. 18 is an explanatory view of the opening/closing device in an assembled state.

As shown in FIG. 14 and FIG. 16, of engaging grooves provided to the opening/closing member 20 in the front and back direction of the pin insertion holes 31, the engaging grooves 33a on the back side (in the front) are made wider than the engaging grooves 33 on the front side (in the back), and the inner surfaces of the engaging grooves 33a have a tapered surface shape inclined so as to become thinner gradually toward the distal end surfaces of the inner wall portions 30.

Figure 15:
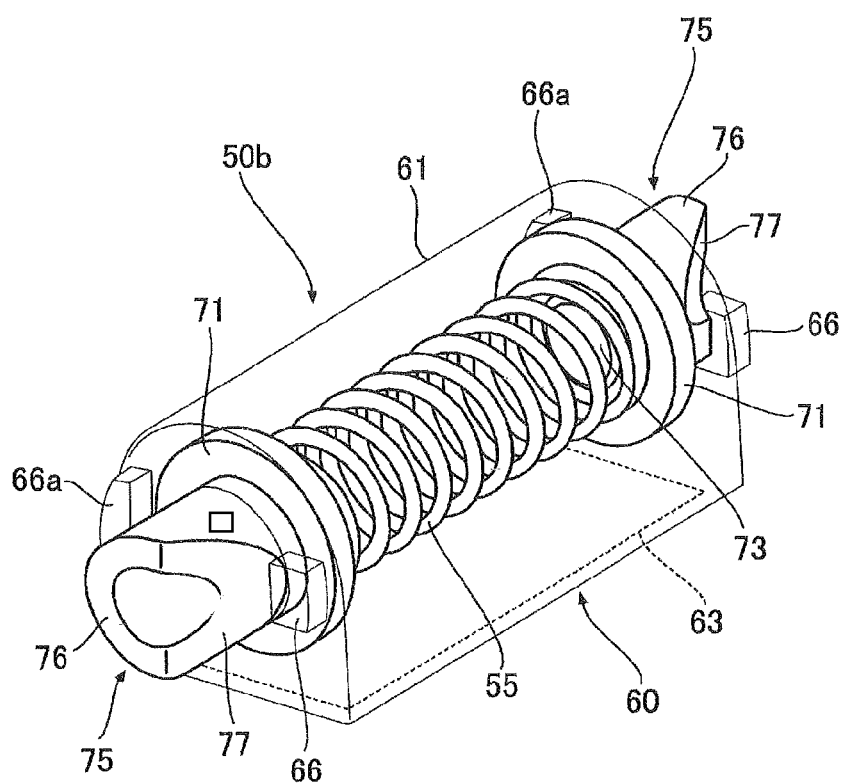
FIG. 15 is a perspective view of a hinge device constituting the opening/closing device.

As shown in FIG. 15, of engaging protruding portions provided on both the front and back sides of the axis holes 64 on the side walls 62 of the case 60 constituting the hinge device 50b, the engaging protruding portions 66a on one side fit the above-described engaging grooves 33a and have the shape wider than the engaging protruding portions 66.

As shown in FIG. 15, in each of the pin-formed pressure contact members 75, a pin 76 having a circular cylindrical shape projects at a predetermined length from the center of one end surface of the base portion 71, the end surface being opposite to the supporting protruding portion 73 for the spring 55. The pins 76 are made to come out from the axis holes 64 of the case 60 while inserted into the pin insertion holes 31 of the inner wall portions 30 and the pin supporting holes 41 of the outer wall portions 40, and are made rotationally movable with respect to the axis holes 64, the pin insertion holes 31, and the pin supporting holes 41.

Tapered surfaces 77 prepared by being obliquely cut from the pin distal ends towards the base portions 71 are provided to the pins 76 on the outer peripheral surfaces. When the case 60 is inserted between the pair of the inner wall portions 30, 30, the pair of pin-formed pressure contact members 75, 75 are pressed by the tapered-shaped engaging grooves 33a of the inner wall portions 30, and pushed in toward the inside of the case against the biasing force of the spring 55.

In the present embodiment, the fixed body 15 and the opening/closing member 20 can be assembled as follows, for example.

First, the pair of pin-formed pressure contact members 75, 75 are inserted individually into the case 60 via the opening 63, and the pins 76 are made to come out from the axis holes 64 while the spring 55 is compressed and inserted into the case 60 and disposed between the pin-formed pressure contact members 75, 75, and both the ends of the spring 55 are held by the supporting protruding portions 73, 73. Thus, the hinge device 50b in which the pair of pin-formed pressure contact members 75, 75 and the spring 55 are set in advance in the case 60 is assembled (see FIG. 15).

Then, the pair of inner wall portions 30, 30 of the opening/closing member 20 are inserted between the pair of outer wall portions 40, 40 of the fixed member 15, and the pin insertion holes 31 of the inner wall portions 30 of the opening/closing member are made to match the pin supporting holes 41 of the outer wall portions 40.

The engaging protruding portions 66, 66a of the case 60 in the hinge device 50b are made to match the engaging grooves 33, 33a of the inner wall portions 30 of the opening/closing member 20, and thus the case 60 is inserted between the pair of inner wall portions 30, 30 of the opening/closing member 20 in this state (see FIG. 16).

Then, the tapered surfaces 77 of the pins 76 are pressed by the tapered-shaped engaging grooves 33a of the inner wall portions 30, and the pair of pin-formed pressure contact members 75, 75 were pushed in toward the inside of the case against the biasing force of the spring 55 (see FIG. 16). When the pins 76 reach the pin insertion holes 31 of the inner wall portions 30, the spring 55 elastically returns to push out the pair of pin-formed pressure contact members 75, 75 toward the outside of the case to insert the pins 76 into the pin supporting holes 41 of the outer wall portions 40, and thereby the opening/closing member 20 can be mounted in an openable and closable manner on the fixed member 15.

As described above, with the opening/closing device 10c according to the present embodiment, it is possible to mount the opening/closing member 20 in an openable and closable manner on the fixed member 15 by easy operation of only inserting the hinge device 50b in which the pair of pin-formed pressure contact members 75, 75 and the spring 55 are set in advance in the case 60 between the pair of inner wall portions 30, 30 and inserting the pins 76 of the pin-formed pressure contact members 75 into the pin insertion holes 31 of the pair of inner wall portions 30 and the pin supporting holes 41 of the pair of outer wall portions 40 while the pin insertion holes 31, 31 of the pair of inner wall portions 30 are made to match the pin supporting holes 41, 41 of the pair of outer wall portions 40, 40. Thus, assembly workability can be improved.

In the present embodiment, while the pin-formed pressure contact members 75 are made rotationally movable with respect to the pin insertion holes 31 of the inner wall portions 30 and the pin supporting holes 41 of the outer wall portions 40, the pressure contact members 75 may be locked with respect to the pin supporting holes 41 of the outer wall portions 40 by providing locking structure arranged to lock the pin-formed pressure contact members 75 and the outer wall portions 40 between the pin-formed pressure contact members 75 and the outer wall portions 40 while may be rotationally movable with respect to the pin insertion holes 31 of the inner wall portions 30.

In this case, a pressure contact force and a frictional force by the spring 55 can be imparted between the pin-formed pressure contact members 75 and the inner surfaces of the case 60. Thus, a free-stop function can be imparted that is capable of stopping the opening/closing member 20 at a given opening angle when the opening/closing member 20 is closed again from the state of being opened from the fixed member 15, or a braking force can be imparted that is capable of slowly closing the opening/closing member 20 that is being opened without suddenly closing the opening/closing member 20.

While the fixed member 15 and the opening/closing member 20 same as those of the first embodiment were used in the present embodiment, the configuration of the present embodiment may be applied to a device including the opening/closing member to which the pair of outer wall portions 40, 40 including the pin supporting holes 41 are provided, and the fixed member 15 to which the pair of inner wall portions 30, 30 including the pin insertion holes 31 are provided as in the second embodiment shown in FIGS. 8 to 11. A device having a structure in which the separate holding members 90, 90 are mounted on the case 60a as in the third embodiment shown in FIG. 12 and FIG. 13 may be applied to the present embodiment.

In the above-described embodiments, the opening/closing device is used in the center console 1 and the armrest 3 disposed between a driver seat and a front passenger seat of an automobile as shown in FIG. 7. Thus, by inserting the case 60 so as to be held between the inner wall portions 30, 30 provided at the base end portion of the opening/closing member 20 that defines a lid having a long plate shape or at one end portion of the box-shaped fixed member 15, and inserting the pin members 80 or the pins 76 of the pin-formed pressure contact members 75 into the pin supporting holes 41 of the outer wall portions 40 and the pin insertion holes 31 of the inner wall portions 30, the opening/closing member 20 that defines a lid can be mounted in an openable and closable manner on the box-shaped fixed member 15. Thus, assembly workability can be improved, and improved design can be achieved because the hinge device can be disposed in an unnoticeable site in a lid and a box.

In the above-described embodiments, the opening/closing device is used in the center console 1 and the armrest 3 disposed between a driver seat and a front passenger seat of an automobile; however, the opening/closing device may be used for opening and closing operation of a lid of a glove compartment, and thus can be widely used for opening and closing operation of a fixed body and an opening/closing member. While the fixed body 15 is the entire box and the opening/closing member 20 is the entire lid in the above-described embodiments, the fixed body, or the opening/closing member may be used as a member attachable to and detachable from a box or a lid, or a part of constituent elements of a box or a lid, and the application is not limited specifically.

DESCRIPTION OF REFERENCE NUMERALS AND SIGNS

1 Center console
2 Armrest
10, 10a, 10b, 10c Opening/closing device
15 Fixed body
20 Opening/closing member
30 Inner wall portion
31 Pin insertion hole
40 Outer wall portion 41 Pin supporting hole
50, 50a, 50b Hinge device
55 Spring
60, 60a Case
64 Axis hole
70 Pressure contact member
75 Pressure contact member with a pin
90 Holding member
92 Insertion hole

The invention claimed is:

1. An opening/closing device, comprising:
a fixed member;
an opening/closing member arranged to open and close the fixed member; and
a hinge device provided separately from the fixed member and the opening/closing member and arranged to mount the opening/closing member in an openable and closable manner on the fixed member,
wherein one of the fixed member and the opening/closing member includes a pair of facing inner wall portions, and a pair of concentric pin insertion holes disposed in the inner wall portions,
wherein the other one of the fixed member and the opening/closing member includes a pair of facing outer wall portions disposed on outer sides of the inner wall portions, and a pair of pin supporting holes disposed in the outer wall portions and arranged to match the pin insertion holes, and
wherein the hinge device includes:
a case provided with axis holes on its both end surfaces, the axis holes being arranged to match the pin insertion holes and the pin supporting holes, and inserted between the pair of facing inner wall portions to be engaged and held with respect to the inner wall portions;
a pair of pressure contact members disposed inside the case, individually inserted into the axis holes, and rotationally movable with respect to the case;
a spring disposed between the pair of pressure contact members so as to press the pressure contact members to be brought into contact with inner surfaces of the case; and
a pin member arranged to be inserted into the pin supporting holes and the pin insertion holes from outside of the outer wall portions so as to engage the pressure contact members.

2. The opening/closing device of claim 1,
wherein the pin members are locked with respect to the pin supporting holes of the outer wall portions, and are rotatable with respect to the pin insertion holes of the inner wall portions.

3. The opening/closing device of claim 1, further including:
a retaining structure arranged to hold the pin member with respect to the outer wall portions, the retaining structure disposed between the pin member and the outer wall portions.

4. The opening/closing device of claim 1, further including:
holding members that are mounted on both inner ends of the case, that include insertion holes communicating with the axis holes, and that include members separate from the case,
wherein the pressure contact members are pressed to be brought into contact with inner peripheries of the insertion holes of the holding members.

5. The opening/closing device of claim 1,
wherein the opening/closing device is for use in a center console and/or an armrest that is disposed between a driver seat and a front passenger seat of an automobile, and
wherein the fixed body has a box shape, and the opening/closing member comprises a lid mounted on the fixed member in an openable and closable manner.

6. The opening/closing device of claim 1, wherein the inner wall portions includes a pair of engaging grooves provided so as to be parallel to a cut across center portions of the pin insertion holes, and
wherein the case includes engaging protruding portions provided projecting on both a front side and a back side of the axis holes on outer surfaces of side walls facing the inner wall portions.

7. The opening/closing device of claim 6, wherein the engaging protruding portions are configured to engage with the engaging grooves.

8. The opening/closing device of claim 6, wherein the hinge device is inserted into the one of the fixed member and the opening/closing member via the engaging protruding portions guided along the pair of engaging grooves to thereby hold the case in a state of being locked between the inner wall portions.

9. The opening/closing device of claim 1, wherein the case, the pair of pressure contact members, and the spring constitute a single member of the hinge device, the single member being engaged and held with respect to the inner wall portions by the pin member of the hinge device.

10. The opening/closing device of claim 1, wherein each of the pressure contact members disposed inside the case includes:
a base portion;
a protruding portion protruding from a center of one end surface of the base portion and arranged to be inserted into the axis holes of the case so as to be rotationally movable; and
a supporting protruding portion protruding from a center of the other end surface of the base portion and arranged to support one end of the spring.

11. The opening/closing device of claim 1, wherein the pin member is inserted through the pin insertion holes and the pin supporting holes from the outside of the outer wall portions towards the case.

12. The opening/closing device of claim 1, wherein the pin member includes flanges arranged to engage peripheral edges on the outer surfaces of the pin supporting holes of the outer wall portions.

13. The opening/closing device of claim 1, wherein the case is provided separately from the inner wall portions.

14. An opening/closing device, comprising:
a fixed member;
an opening/closing member arranged to open and close the fixed member; and
a hinge device provided separately from the fixed member and the opening/closing member and arranged to mount the opening/closing member in an openable and closable manner on the fixed member,
wherein one of the fixed member and the opening/closing member includes a pair of facing inner wall portions, and a pair of concentric pin insertion holes disposed in the inner wall portions,
wherein the other one of the fixed member and the opening/closing member includes a pair of facing outer wall portions disposed on outer sides of the inner wall portions, and a pair of pin supporting holes disposed in the outer wall portions and arranged to match the pin insertion holes, and wherein the hinge device includes:

a case provided with axis holes on its both end surfaces, the axis holes being arranged to match the pin insertion holes and the pin supporting holes, and inserted between the pair of facing inner wall portions to be engaged and held with respect to the inner wall portions;

a pair of pin-formed pressure contact members disposed inside the case so as to be inserted into the pin insertion holes and the pin supporting holes through the axis holes; and a spring disposed between the pair of pin-formed pressure contact members so as to press the pin-formed pressure contact members to be into contact with inner surfaces of the case, such that pins of the pin-formed pressure contact members are allowed to be pushed into the case while compressing the spring.

15. The opening/closing device of claim 14, wherein the pin-formed pressure contact members are locked with respect to the pin supporting holes of the outer wall portions, and are rotatable with respect to the pin insertion holes of the inner wall portions.

16. The opening/closing device of claim 14, further including:

holding members that are mounted on both inner ends of the case, that include insertion holes communicating with the axis holes, and that include members separate from the case, wherein the pin-formed pressure contact members are pressed to be brought into contact with inner peripheries of the insertion holes of the holding members.

17. The opening/closing device of claim 14, wherein the opening/closing device is for use in a center console and/or an armrest that is disposed between a driver seat and a front passenger seat of an automobile, and wherein the fixed body has a box shape, and the opening/closing member comprises a lid mounted on the fixed member in an openable and closable manner.

18. The opening/closing device of claim 14, wherein the case is provided separately from the inner wall portions.

19. An opening/closing device, comprising:

a fixed member;

an opening/closing member arranged to open and close the fixed member; and a hinge device arranged to mount the opening/closing member in an openable and closable manner on the fixed member, wherein one of the fixed member and the opening/closing member includes a pair of facing inner wall portions, and a pair of concentric pin insertion holes disposed in the inner wall portions, wherein the other one of the fixed member and the opening/closing member includes a pair of facing outer wall portions disposed on outer sides of the inner wall portions, and a pair of pin supporting holes disposed in the outer wall portions and arranged to match the pin insertion holes, wherein the hinge device includes:

a case provided with axis holes on its both end surfaces, the axis holes being arranged to match the pin insertion holes and the pin supporting holes, and inserted between the pair of facing inner wall portions to be engaged and held with respect to the inner wall portions;

a pair of pressure contact members disposed inside the case, individually inserted into the axis holes, and rotationally movable with respect to the case;

a spring disposed between the pair of pressure contact members so as to press the pressure contact members to be brought into contact with inner surfaces of the case; and a pin member arranged to be inserted into the pin supporting holes and the pin insertion holes from outside of the outer wall portions so as to engage the pressure contact members, and wherein the case is provided separately from the inner wall portions.

* * * * *